(12) United States Patent
Payne

(10) Patent No.: US 8,098,237 B2
(45) Date of Patent: Jan. 17, 2012

(54) STYLUS FOR DATA COLLECTION DEVICES

(75) Inventor: Gregory Jon Payne, Charlotte, NC (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 1060 days.

(21) Appl. No.: 11/962,598

(22) Filed: Dec. 21, 2007

(65) Prior Publication Data
US 2009/0160825 A1    Jun. 25, 2009

(51) Int. Cl.
*G06F 3/033* (2006.01)
(52) U.S. Cl. ............... 345/173; 235/462.01; 345/156; 345/179
(58) Field of Classification Search .......... 345/173–183; 235/462.01
See application file for complete search history.

(56) References Cited

U.S. PATENT DOCUMENTS

| 6,491,225 B1 * | 12/2002 | Dvorkis et al. | 235/472.01 |
| 6,572,019 B1 * | 6/2003 | Rando et al. | 235/472.01 |
| 6,729,547 B1 * | 5/2004 | Charlier et al. | 235/462.45 |

* cited by examiner

*Primary Examiner* — Amare Mengistu
*Assistant Examiner* — Vinh Lam
(74) *Attorney, Agent, or Firm* — Hiscock & Barclay, LLP

(57) ABSTRACT

A data collection device having a touch pad, supported by a housing, for receiving input from a stylus having a first end adapted to interact with the touch pad so as to input data through movement of the first end relative to the touch pad and a second end having a light source to illuminate dark areas. The housing is adapted to receive and support the stylus. In an additional embodiment, the stylus is supported by the housing in such a manner as to allow the stylus to project light in a predetermined direction to assist with the illumination of a data source. In another additional embodiment, the housing has contacts that facilitate the provision of power to the stylus for charging a battery in the stylus and/or powering the light source. In yet another embodiment, the light source on the stylus is adapted to be controlled via user interaction with interface elements on the housing, such as keys, buttons, or the touch pad.

6 Claims, 6 Drawing Sheets

STYLUS FOR DATA COLLECTION DEVICES

BACKGROUND OF THE INVENTION

Data collection devices are a class of device used to collect, process, and transfer data to a data processing system. Data collection devices may be provisioned with one or more of a variety of data collection sub-systems including: imager, laser scanner, RFID scanner, and magnetic media scanner. Such sub-systems generally scan some data bearing device such as dataforms (e.g. barcodes), magnetic stripes, and RFID tags. The collected data is processed within the data collection device by a processor and associated circuits. The type and amount of processing may vary depending on the class of device, but usually includes, at a minimum, decoding the output of the data collection sub-system to generate a string of data corresponding to the encoded data contained within the data bearing device. The decoded data is then generally transferred using any number of wired and wireless communication paths, such as 802.11, cellular, IrDA, USB, serial and parallel paths.

Generally, data collection devices can be thought of as falling into three classes, fixed, mobile, and handheld. Fixed devices are generally incorporated into stationary objects such as point of sale systems (examples include transaction terminals and image kiosks) and walls (examples include RFID tracking devices). Mobile devices generally have similar electronic configurations to fixed devices, but are mechanically designed to be mounted on movable objects, such as carts and fork lifts. Finally, hand held devices are designed to be carried around by a user (examples include portable data terminals (PDTs), and bar code scanners).

Many handheld and mobile class devices are utilized in environments wherein the lighting is less than ideal. For example, one industry where data collection devices are popular is package delivery. Delivery persons are often called upon to utilize portable data collection devices in poorly illuminated areas such as the back of delivery trucks. Another industry that extensively utilize data collection devices is the warehousing industry where workers area often in dimly lit areas for much of their shifts. The classic solution in these and other industries is to carry a flashlight in addition to the data collection device. This can be cumbersome where additional items are also being carried, such as packages. The present inventors have recognized a need for a more user friendly solution to illuminating dark areas.

BRIEF DESCRIPTION OF THE DRAWINGS

An understanding of certain embodiments of the present invention can be gained from the following detailed description of said embodiments taken in conjunction with the accompanying drawings of which.

DETAILED DESCRIPTION

Figure 1:
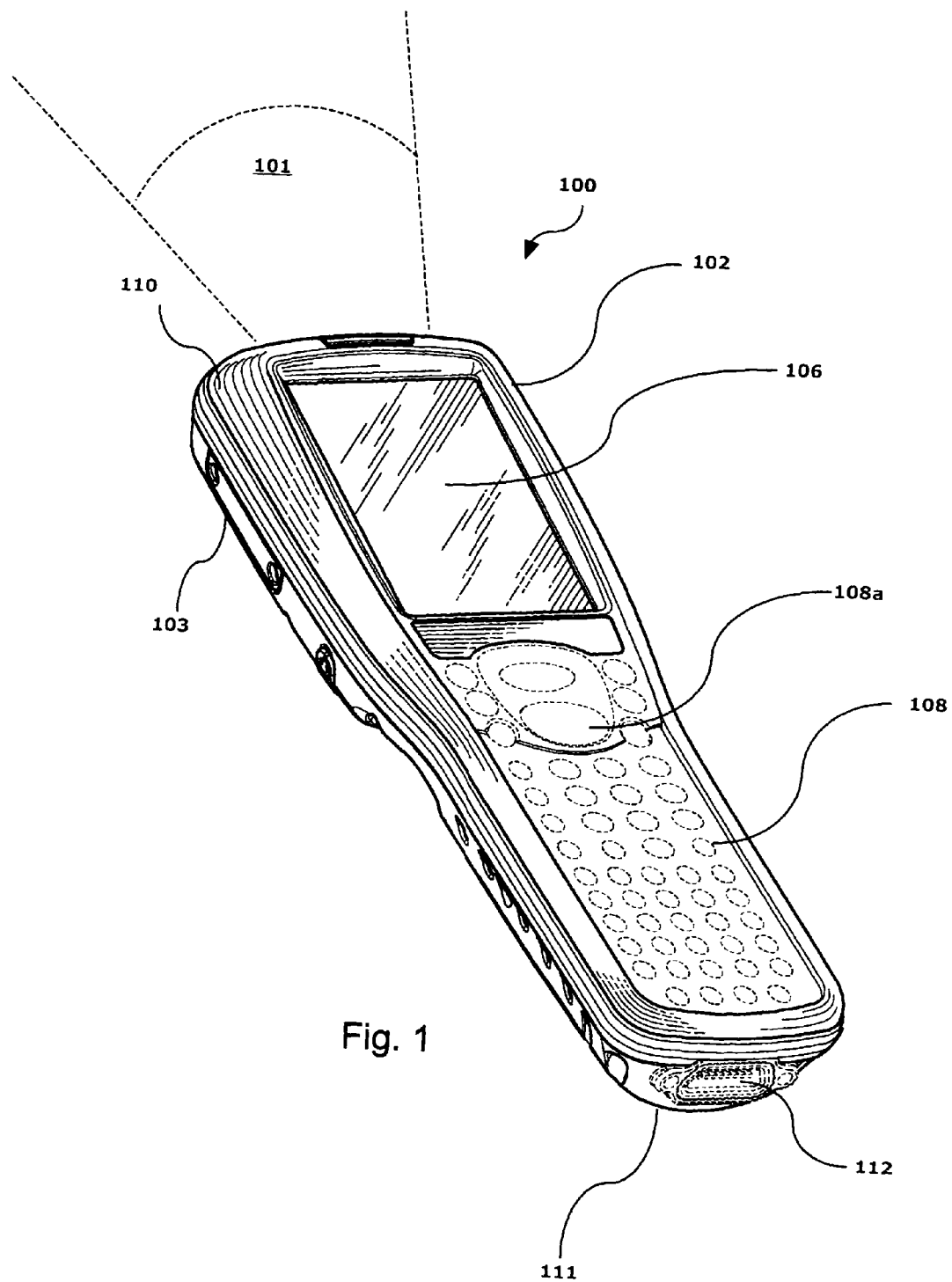
FIG. 1 is an isometric view of a PDT in accordance with an embodiment of the present invention.

Reference will now be made in detail to embodiments of the present invention, examples of which are illustrated in the accompanying drawings, wherein like reference numerals refer to like elements throughout. It is to be noted that an element number followed by a letter generally indicates multiple occurrences of elements that are similar in structure and/or function. Further, the use of an italicized "n" associated with an element number generally denotes either an unspecified number of instances of such element or a partial or complete grouping of such elements—the meaning of which is to be drawn from the context of such use.

Figure 2:
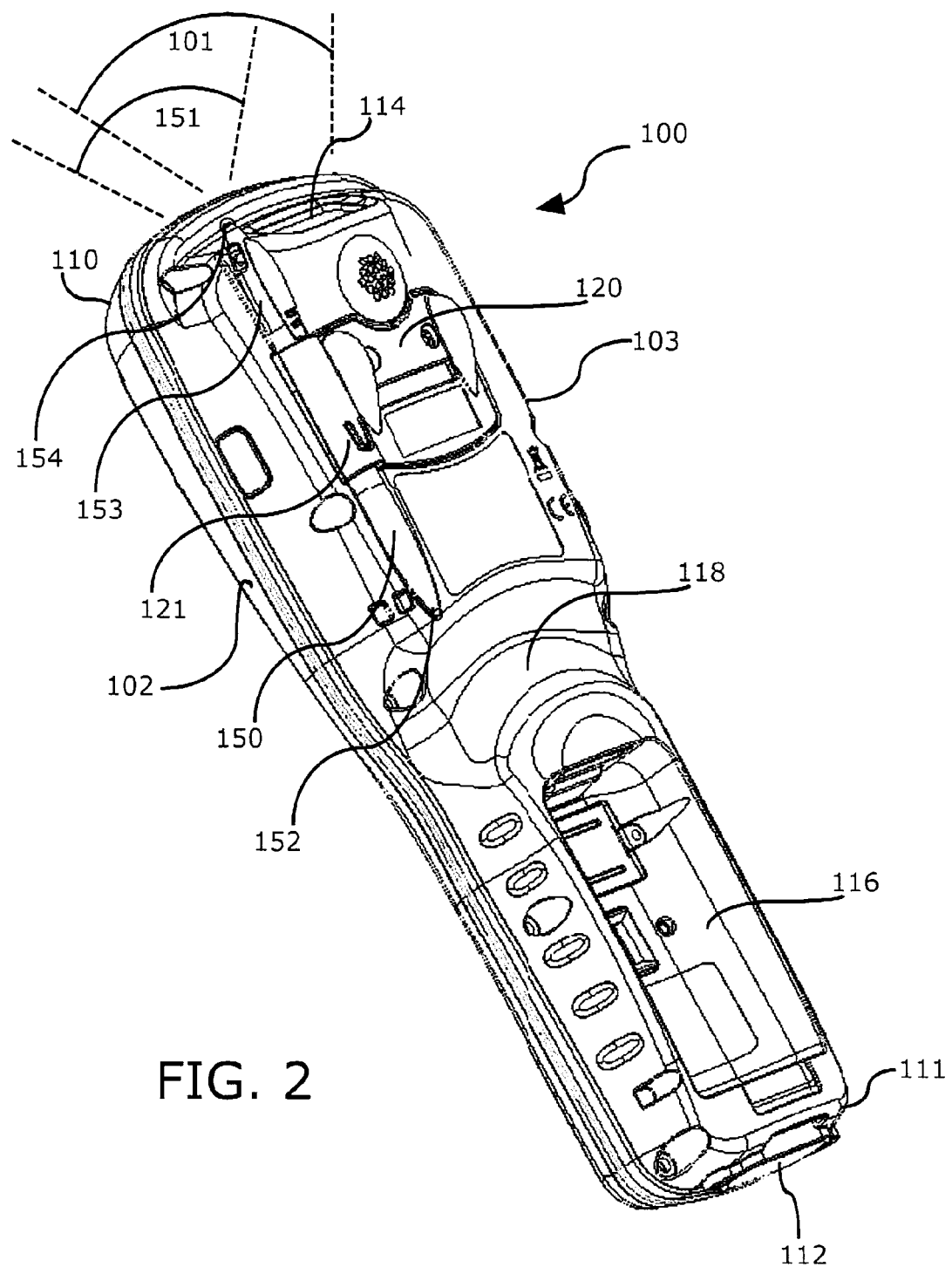
FIG. 2 is an isometric view of a PDT in accordance with an embodiment of the present invention.

FIGS. 1 and 2 illustrate a portable data terminal (PDT) in accordance with an embodiment of the present invention. PDTs generally integrate a mobile computer, one or more data transport paths and one or more data collection sub-systems. The mobile computer portion is generally similar to known touch screen consumer oriented portable computing devices (e.g. "Pocket PCs" or "PDAs"), such as those available from PALM, HEWLETT PACKARD, and DELL. The data transport paths include wired and wireless paths, such as 802.11, IrDA, BLUETOOTH. RS-232, USB. CDMA. GSM (incl. GRPS), and so forth. The data collection subsystem generally comprises a device that captures data from an external source, for example, touches, keystrokes, RFID signals, images, and bar codes. PDTs further distinguish from consumer oriented portable computing devices through the use of "industrial" components integrated into a housing that provide increased durability, ergonomics, and environmental independence over consumer oriented devices. Additionally, PDTs tend to provide improved battery life by utilizing superior batteries and power management systems. PDTs are available from several sources, including the assignee of the present application: HAND HELD PRODUCTS, INC.

FIG. 1 is an isometric view of a PDT 100 in accordance with an embodiment of the present invention. The PDT 100 utilizes an elongated water resistant housing the top half 102 of which is clearly illustrated in FIG. 1. The housing supports a variety of components, including: a battery (not illustrated); a touch screen 106 (generally comprising a LCD screen under a touch sensitive panel); a keypad 108 (including a scan button 108a); a scan engine (not illustrated): and a data/charging port 112 (see FIG. 2). The scan engine may comprise, for example, one or more of an image engine, a laser engine or an RFID engine (the present description will assume the use of an image engine). The scan engine, generally located near a top end 110 of the PDT 100, has a scan zone 101 within which a data carrier, such as a 1-D or 2-D barcode, may be sensed. The data/charging port 112 typically comprises a proprietary mechanical interface with one set of pins or pads for transmitting and receiving data (typically via a serial interface standard such as USB or RS-232) and a second set of pins or pads for receiving power for operating the system and/or charging the battery. The data charging port is generally located near a bottom end 111 of the PDT 100.

FIG. 2 is an isometric view of a PDT 100 in accordance with an embodiment of the present invention. A window 114 on the top end 110 of the PDT 100 permits the scan engine to receive light, reflected or otherwise, to perform dataform scanning within an aiming area 101. The bottom housing has a battery well 116 to receive a battery (not illustrated) and stylus well 122 to receive a stylus 150. A finger saddle 118 facilitates ergonomic grip of the PDT 100.

In use, the user positions the PDT 100 such a that a dataform, for example a bar code, is positioned within the scan zone 101 and presses the scan key 108a to initiate data capture via the image engine. The captured data is analyzed. e.g. decoded (to identify the information represented), stored, and displayed on the touch screen 106. Additional processing of the data may take place on the PDT 100 and/or an external data processing resource to which the data is transmitted.

The stylus 150 generally comprises a first end 152 with a tip designed to interact with the touch screen 106 and a second end 153 with a light source 159. It may prove beneficial to align an arc 151 of light emitted by the light source 154 with the scan zone 101. The stylus is secured in the stylus well 122 by a flexible tab 121 on a stylus cover 120. The stylus cover 120 may be integrally molded with the bottom housing 103 or, as illustrated in FIG. 2, may comprise a separate part secured to the bottom housing 103, for example by ultrasonic welding, glue, or mechanical fasteners such as screws.

FIG. 3a through 3d are views of styluses 300, 320, 350 and 370 in accordance with embodiments of the present invention. The styluses 300, 320 and 350 illustrate various combinations of features, including recharging contacts and activation means.

Figure 3A:
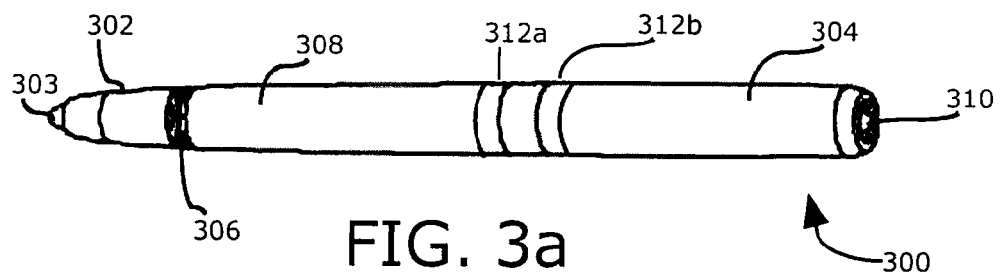
FIGS. 3a through 3d are views of stylus in accordance with an embodiment of the present invention.

FIG. 3a illustrates a cylindrical stylus 300 having a first end 302 with a tip 303 for interacting with a touch screen and a second end 304 with a light source 310, such as an LED. The stylus 300 preferably has a diameter slightly smaller than the inside diameter of the stylus well 122 so as to be insertable therein. A feature 306, such as the illustrated groove, interacts with the tab 121 when inserted into the stylus well 122. The LED light source 310 may be powered using any suitable means, including for example AAAA sized batteries (42.5 mm long and 8.3 mm in diameter) secured within a shaft 308 of the stylus 300. In the example illustrated in FIG. 3a, the state of the light source 310 is controlled by two conductive rings 312a and 312b. The user may illuminate the light source 310 by laying a finger across both rings 312a and 312b. One suitable touch sensitive mechanism is described in U.S. Pat. No. 7,185,999 incorporated herein by reference.

Figure 3B:
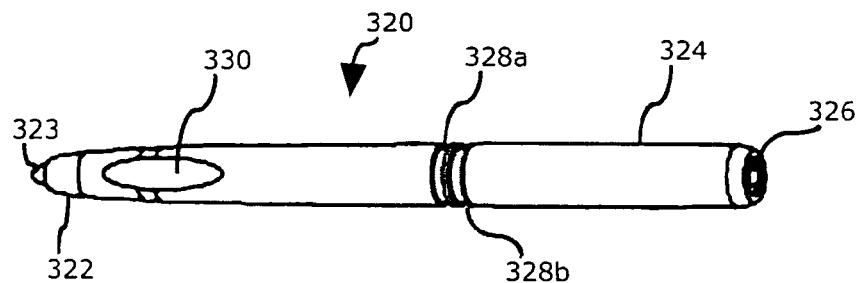

FIG. 3b illustrates a stylus 320 having a first end 322 with a tip 323 for interacting with a touch screen and a second end 324 with a light source 326, such as an LED. The stylus 320 is further provided with two conductive bands 328a and 328b which may be used to charge batteries secured within the shaft of the stylus 300. The state of a light source 328 is controlled using a touch sensitive switch 330.

Figure 3C:
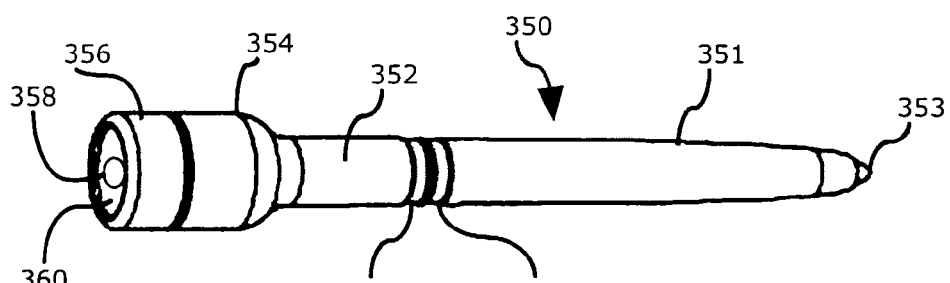

FIG. 3c illustrates a stylus 350 having a first end 3351 with a tip 353 for interacting with a touch screen and a second end 354 with a light source 358, such as an LED. The second end 354 has a larger diameter than a central shaft 352 of the stylus 350. The larger diameter accommodates a rotating ring 356 that controls the state of the light source 358. A lens 360 may be provided to protect the light source 358 and optionally focus light emanating therefrom. The stylus 350 is further provided with two conductive bands 362a and 362b which may be used to charge batteries secured within the shaft 352 of the stylus 350.

Figure 3D:
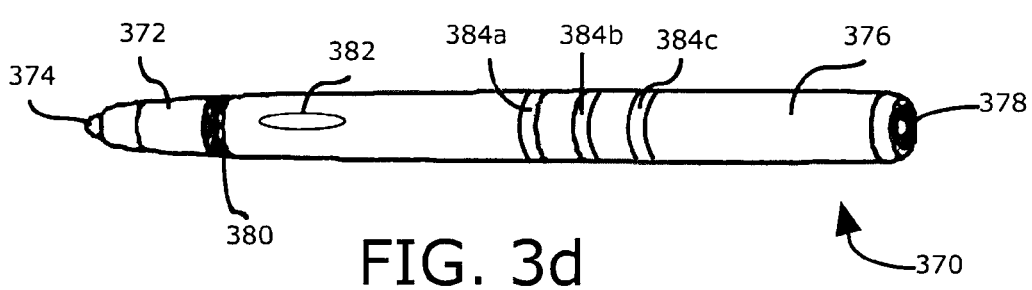

FIG. 3d illustrates a cylindrical stylus 370 having a first end 372 with a tip 374 for interacting with a touch screen and a second end 376 with a light source 378, such as an LED. The stylus 300 preferably has a diameter slightly smaller than the inside diameter of the stylus well 122 so as to be insertable therein. A feature 30, such as the illustrated groove, interacts with the tab 121 when inserted into the stylus well 122. The LED light source 378 is powered with a rechargeable power source secured within a shaft of the stylus 370. In the example illustrated in FIG. 3d, the state of the light source 378 is controlled in two manners. A touch sensitive switch 382 is provided to allow a user to turn the light source 378ON and OFF when the stylus 370 is separated from the PDT 100. Three conductive rings 384a, 384b and 384c are provided to interface with the PDT 100. The conductive rings 384n facilitate control of the state of the light source 378 from the PDT 100 along with recharging the stylus' 370 power source from batteries on the PDT. Additionally, the conductive rings 384n facilitate powering the light source 378 from the battery on the PDT.

Figure 4:
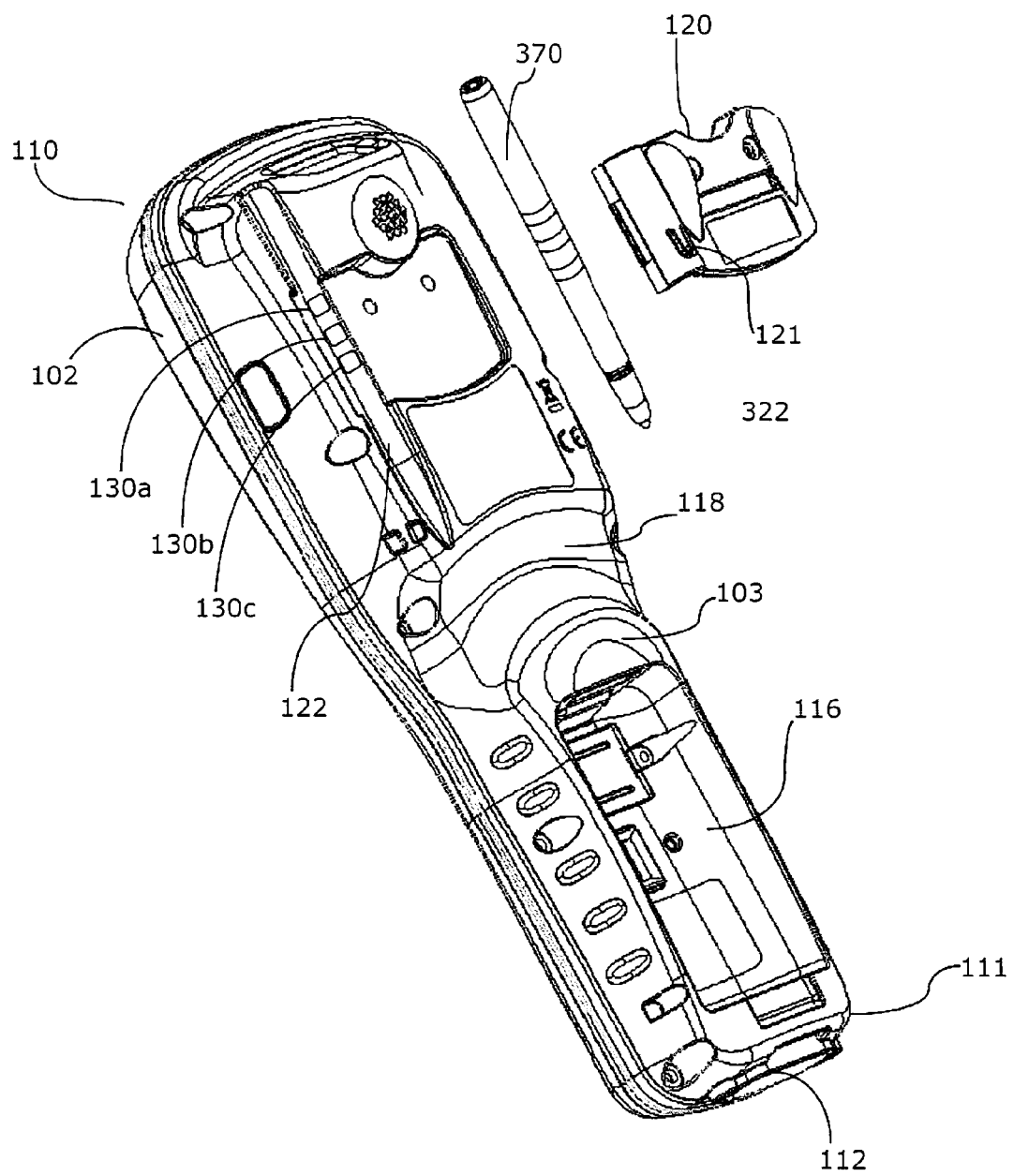
FIG. 4 is an exploded view of a PDT in accordance with an embodiment of the present invention.

FIG. 4 is an exploded view of a PDT 100 in accordance with an embodiment of the present invention. In particular, FIG. 4 illustrates a stylus system utilizing the stylus 370 illustrated in FIG. 3d. The stylus cover 120 secures a stylus 370 in a well 122 on the bottom housing 102 of the PDT 100. The well 122 has three contacts 130a 130b, and 130c, comprising, for example, leaf springs or POGO pins. The contacts 130n engage the conductive rings 312n on the stylus 370 when the stylus 370 is inserted into the well 122. As noted, the conductive rings 384n facilitate control of the state of the light source 378 from the PDT 100 along with recharging the stylus' 370 power source from batteries on the PDT. Additionally, the conductive rings 384n facilitate powering the light source 378 from the battery on the PDT. In the event, a stylus is utilized with alternative configurations, such as those illustrated in FIGS. 3a, 3b, and 3c, the contacts 130n may have a different configuration. For example, if the stylus is configured to be one of rechargeable or remote activatable, only two contacts may need to be provided.

Figure 5:
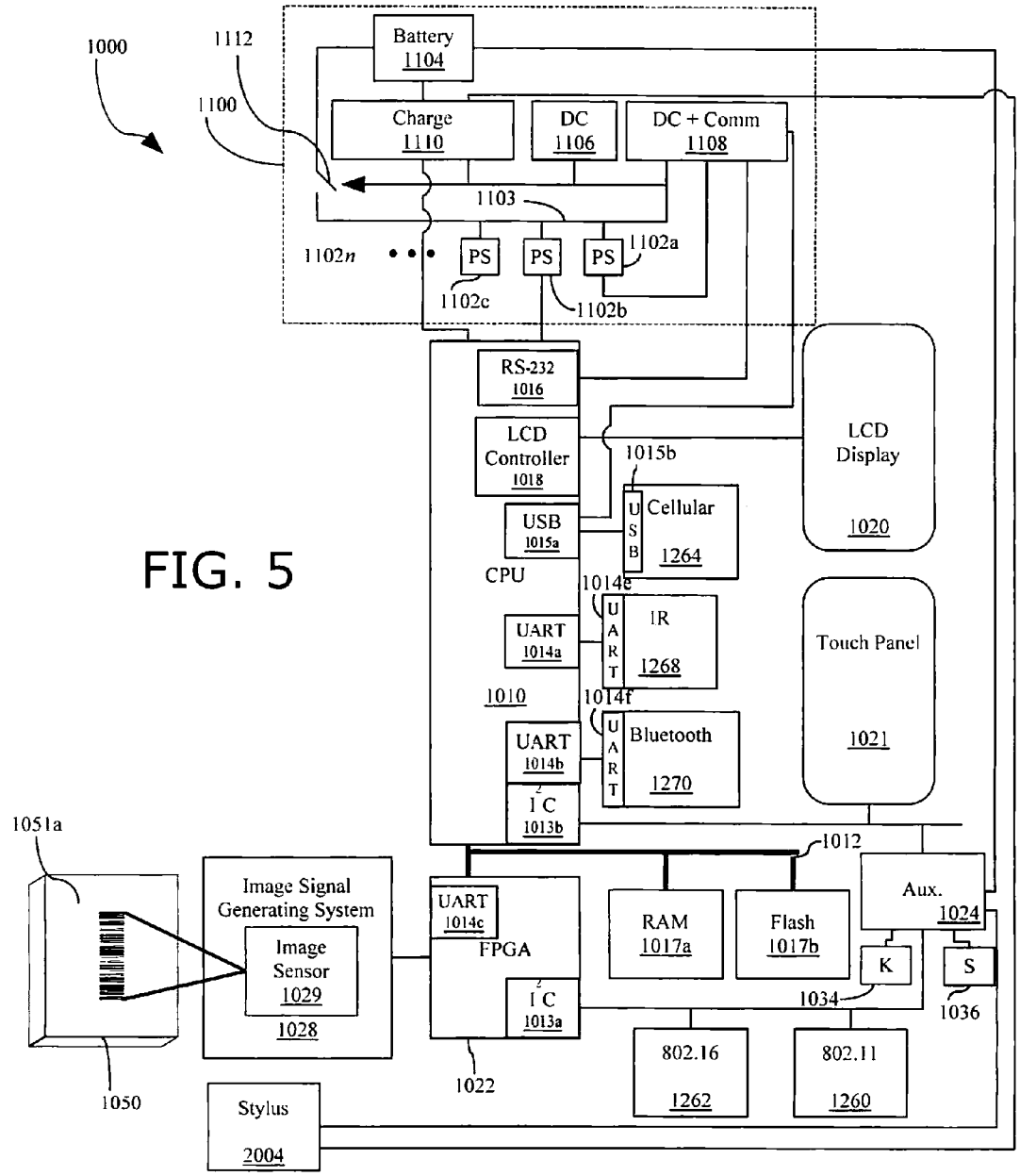
FIG. 5 is a block diagram of a PDT in accordance with an embodiment of the present invention.

FIG. 5 is a block diagram of a PDT and stylus in accordance with embodiments of the present invention. Those of ordinary skill in the art will recognize that the illustrated design of the PDT 1000 has been simplified so as to permit a briefer explanation of systems and components not directly related to the present invention.

A central processing unit (CPU) 1010 receives data from and outputs data to other sub-systems for storage, transmission and additional processing. CPU 1010 may be implemented using any number of off the shelf solutions including: embedded processors, such as an XSCALE processor available from INTEL; general purpose processors, such as a PENTIUM 4 available from INTEL; or any number of custom solutions including pre-configured field programmable gate arrays (FPGAs) and application specific integrated circuits (ASICs). Overall operation of the CPU 1010 is controlled by software or firmware, typically referred to as an operating system, stored in one or more memory locations 1017n, including RAM 1017a and FLASH memory 1017b. Examples of suitable operating systems for PDT 1000 include: WINDOWS MOBIL, WINDOWS CE, WINDOWS XP, LINUX, PALM, SYMBIAN, and OSX.

In general, communication to and from the CPU 1010 and the various sub-components takes place via one or more ports or busses, including a main system bus 1012: I$^2$C busses 1013a and 1013b; a plurality of Universal Asynchronous Receivers/Transmitter (UART) ports 1014n, a Universal Serial Bus (USB) 1015n, and an RS-232 port 1016.

The illustrated CPU 1010 also includes a liquid crystal display (LCD) controller 1018 for controlling an LCD 1020. A touch sensitive panel 1021, which may be in communication with one or more of the CPU 1010 and an auxiliary processor 1024 via the I2C bus 1013b, may be associated with the LCD 1020 for receipt of data thereon. The combination of the LCD 1020 and the touch sensitive panel 1021 is often referred to as a "touch screen."

A variety of secondary (or "sub") processors may be provided to perform general and application specific functions. The example illustrated in FIG. 2 provides two such processors: a field programmable gate array (FPGA) 1022 and the auxiliary processor 1024. The FPGA 1022 may comprise any number of FPGA including the Virtex-4 family available from XILINX. The auxiliary processor 1024 may comprise any number of embedded (or general purpose) processors, including the PICmicro® family of microcontrollers available from MICROCHIP TECHNOLOGY.

The auxiliary processor 1024 may interface with and control a variety of data input devices including, for example, the touch panel 1021, a keyboard 1034 and a scan button 1036. By way of example, the PDT 1000 may be configured so that displayed menu options are selected by physically depressing a key on the keyboard 1034 or activating the touch screen 1021 with use of a finger or stylus. The scan button 1036 may be used for initiating and controlling the various data collection systems, such as an image signal generating system 1028, an RFID sensing system 1030, or a magnetic stripe reader 1040.

Any resident data collection systems (e.g. an image signal generating system 1028) may be controlled by one or more of the CPU 1010, the auxiliary processor 1024, and the FPGA 1022. In this case, the FPGA 1022 initiates and controls the operation of the data collection systems and accumulates data received there from prior to depositing such data in memory 1017n. Possible configurations of FPGA 1022 are illustrated in U.S. Pat. No. 6,947,612 incorporated herein by reference.

The image signal generating system 1028 generally comprises a two dimensional solid state image sensor 1029 utilizing such technologies as CCD, CMOS, and CID, for capturing an image containing data. e.g. a bar code or signature. Two-dimensional solid state image sensors generally have a plurality of photo sensor picture elements ("pixels") which are formed in a pattern including a plurality of rows and a plurality of columns of pixels. The image signal generating system 1028 further includes an imaging optics (not shown) focusing an image onto an active surface of the image sensor 1029. Image sensor 1029 may be incorporated on an image sensor IC chip having disposed thereon image sensor control circuitry, image signal conditioning circuitry, and an analog-to-digital converter. FPGA 1022 manages the capture and transfer of image data into RAM 1017n. Decoding may be performed by the CPU 1010 or any suitable secondary processor. Examples of devices suitable for use as the imaging assembly 1028 include an IMAGETEAM 5x00VGA/5x00MPX imaging module of the type available from Hand Held Products, assignee of the present application. A variety of alternatives, including dedicated laser barcode scanners may also be utilized.

One use of the image signal generating system 1028 is for reading and interpreting bar codes such as bar code 1051a on an item 1050. For this operation, when the scan button 1036 is actuated, the CPU 1010 causes the appropriate control signals to be sent to the image sensor 1029. In response thereto, the image sensor 1029 outputs digital image data including (hopefully) an adequate representation of the bar code symbol 1050. The digital image data is streamed to the FPGA 1022 where it is collected and subsequently deposited in memory 1017n. In accordance with a decoding program (not specifically illustrated) an attempt may be made to decode the bar code represented in the captured electronic image representation. The capture and decoding of image data may occur automatically in response to a trigger signal being generated, usually by activation of the scan button 1036 or a pre-selected key on keyboard 1034. For example, the CPU 1010 may be configured, typically through execution of a program resident in memory 1017n, to continuously capture and decode bar code symbols represented therein as long as scan button 1036 is actuated. The cycle may be terminated upon successfully decoding the bar code symbol or by timing out after a number of unsuccessful attempts.

In addition to having a decode operation, the image signal generation system 1028 may also be configured for an image capture operation. In an image capture operation, control circuit 1010 captures an electronic image representation in response to the scan button 1036 being actuated without attempting to decode a decodable symbol represented therein. The captured electronic image representation may be one or more of (i) stored into a designated memory location of memory 1017n, (ii) transmitted to an external spaced apart device, or (iii) displayed on LCD 1020. This mode may be used to capture, for example an image of a signature or damage to a package.

In an image capture operation, the image signal generation system 1028 may be operated in two distinct stages: aiming and final capture. During the aiming stage, frames output by the image signal generation system 1028 are displayed on the LCD display 1020. These frames are not saved. Once a user is satisfied with the content of the image displayed on the LCD display 1020, he or she initiates the final capture stage. In final capture stage, a frame (either the frame currently in the buffer or a next frame) is saved and typically displayed on the LCD 1020. Generally, the aiming stage is initiated by pressing a designated button (such as a scan button 1036) with the final capture stage being initiated by releasing the designated button. It is generally desirable to display frames as quickly as possible in the aiming stage to ensure that the user is viewing a recently outputted frame. Otherwise there is a danger that the frame the user views when deciding to initiate capture is outdated and does not accurately reflect what the image signal generating system 1028 is currently outputting (and what will be captured in final capture stage).

The PDT 1000 may further include a plurality of wireless communication links such as an 802.11 communication link 1260, an 802.16 communication link 1262, a communication link 1264 for communication with a cellular network such as a network in accordance with the Global System for Mobile Communications (GSM), an IR communication link 1268, and a Bluetooth communication link 1270. Each of these links facilitates communication with a remote device and may be used to transfer and receive data.

A power circuit 1100 supplies power to the PDT 1000. The power circuit 1100 generally comprises a series of power supplies 1102n that regulate the power supplied to the various components of the PDT 1000. The power supplies 1102n each generally comprise step up or step down circuits which are in turn connected to each of the various components in the PDT 1000 that require the particular voltage output by that power supply 1102n.

The power supplies receive current from a power bus 1103 which is, in turn, supplied by one of a battery 1104, a first power input 1106 or a connector 1108 that includes a second power input. The first power input 1106 may comprise a DC power jack, for example, a 2.5 mm coaxial DC power plug which receives 9.5 volts from a conventional AC/DC transformer. The connector 1108 may comprise any number of known connection technologies, such as the D Series of circular plastic connectors or the HCL D-sub derivative design data transfer connector available from HYPERTRONICS, INC. Certain pins of the connector 1108 may be dedicated to receiving DC power, for example 9.5 volts, while other pins are dedicated to one or more communication paths, e.g. RS-232 and USB. It may also prove advantageous to provide DC power out, for example from a power supply 1102a, so as to power tethered accessories such as external magnetic stripe or RFID readers (not shown). It may prove further advantageous to add circuitry to insulate the first power input 1106 from the second power input on the connector 1108 and other components in the PDT 1000 in the event that a user attempts to supply power to both power inputs.

The battery 1104 may be selected from any of a variety of battery technologies including fuel cell, NiMh, NiCd, Li Ion, or Li Polymer. The battery 1104 is charged by a charge circuit 1110 which receives power from either the first power input 1106 or the second power input on the connector 1108. The charge circuit may comprise any of a number of available circuits. In the example shown in FIG. 2, control is provided to the CPU 1016 which may modify the charging behavior of the charge circuit 1110 based on information generated by the auxiliary processor 1024. In this example the auxiliary processor 1024 monitors battery chemistry, such as gas content, via known interfaces, such as the SMART battery interface as specified by the Smart Battery System Implementers Forum. A switch 1112 isolates the battery based upon the presence of power from the first power input 1106 or the second power input on the connector 1108. Thus, when an external power supply is connected to the power input 1106 or the second power input on the connector 1108, the battery is isolated from the power supplies 1102*n* and may be charged via the charge circuit 1110. Once power is removed from the power input 1106 and the connector 1108, the battery is connected to the power supplies 1102*n*.

A stylus 2004 is illustrated as being connected to the charge circuit 1110 and the auxiliary processor 1024. The charge circuit 1110 provides a charging current to the stylus 2004. The auxiliary processor 1024 controls the ON/OFF state of the stylus 2004 in response to user actions. It is to be noted that both connections may not be needed depending on the configuration of the stylus 2004. For example, the stylus may be turned ON when the user presses a scan button 1036 to illuminate the barcode being scanned. As another example, the keyboard 1034 may be provided with a special key that turns the stylus ON and OFF. Alternatively, the touch panel 1021 may be utilized to instruct the auxiliary processor 1024 to turn the stylus 2004 on and off. In yet another example, the PDT 1000 may be executed using a vertical grip with a trigger. The trigger may be a two stage affair wherein activation of the first stage causes the stylus 2004 to illuminate and activation of the second stage causes the image sensor 1029 to capture an image.

Figure 6:
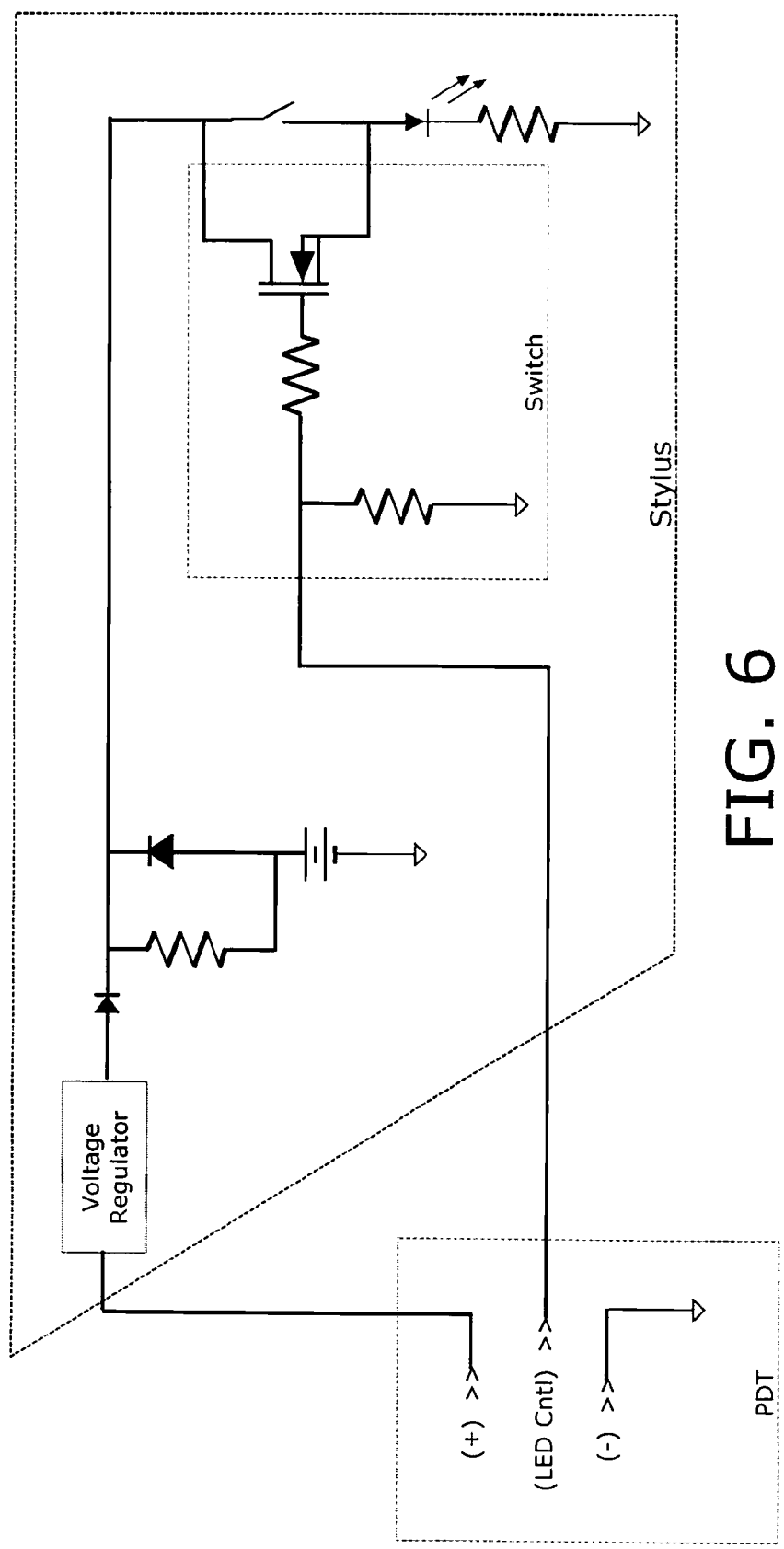
FIG. 6 is a circuit diagram of a stylus system in accordance with an embodiment of the present invention.

FIG. 6 is a circuit diagram of a stylus system in accordance with an embodiment of the present invention. The circuit illustrated in FIG. 6 is suitable for use with the stylus 370 illustrated in FIG. 3*d*. The circuit provides the following features: 1) charging of the stylus' battery: 2) turning the stylus light source ON and OFF from the PDT; and 3) using the PDT battery to power the stylus light source.

Although some embodiments of the present invention have been shown and described, it will be appreciated by those skilled in the art that changes may be made in these embodiments without departing from the principles and spirit of the invention, the scope of which is defined in the claims and their equivalents. For example, it may prove preferable to attach the stylus to a strap associated with the PDT as opposed to a well in the housing of the PDT. This mode of securing the stylus is particular applicable to embodiments wherein electrical communication. e.g. for recharging and switching, with the PDT are not required.

What is claimed is:

1. A data collection system comprising:
    a touch pad for receiving input;
    a stylus having a first end adapted to interact with the touch pad so as to input data through movement of the first end relative to the touch pad and a second end having a light source;
    a hand held housing securing the touch pad, the hand held housing adapted to receive and support the stylus in a well, the hand held housing having a top end;
    a scan engine located within the hand held housing near the top end having a scan zone within which a data carrier may be sensed;
    wherein the light source emits an arc of light aligned with the scan zone.

2. A data collection system, as set forth in claim 1, wherein the light source comprises an LED.

3. A data collection system as set forth in claim 1, wherein the hand held housing is adapted to support the stylus in such a manner that the second end is pointed along a longitudinal axis of the hand held housing.

4. A method of operating a data collection system comprising:
    receiving input from a touch pad;
    interacting with the touch pad with a first end of a stylus so as to input data through movement of the first end relative to the touch pad;
    scanning barcodes within a scan zone utilizing a scan engine disposed near the top end of a hand held housing supporting the touch pad and scan engine;
    illuminating barcodes within the scan zone with a light source disposed on a second end of the stylus;
    wherein the hand held housing is adapted to receive and support the stylus in a well and the light source illuminates the barcode when the stylus is disposed in the well.

5. A method of operating a data collection system as set forth in claim 4, wherein the light source comprises an LED.

6. A method of operating a data collection system as set forth in claim 4, wherein the hand held housing is adapted to support the stylus in such a manner that the second end is pointed along a longitudinal axis of the hand held housing.

* * * * *